Aug. 13, 1929.  W. E. HART  1,724,582
LIQUID FUEL ELEVATING DEVICE FOR MOTOR VEHICLES
Filed Dec. 31, 1927  3 Sheets-Sheet 1
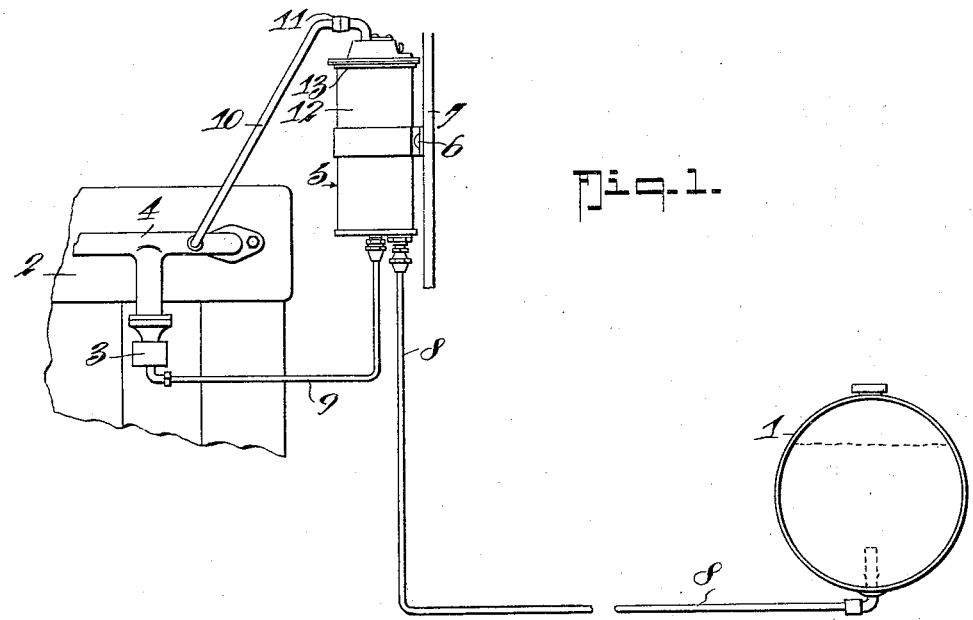
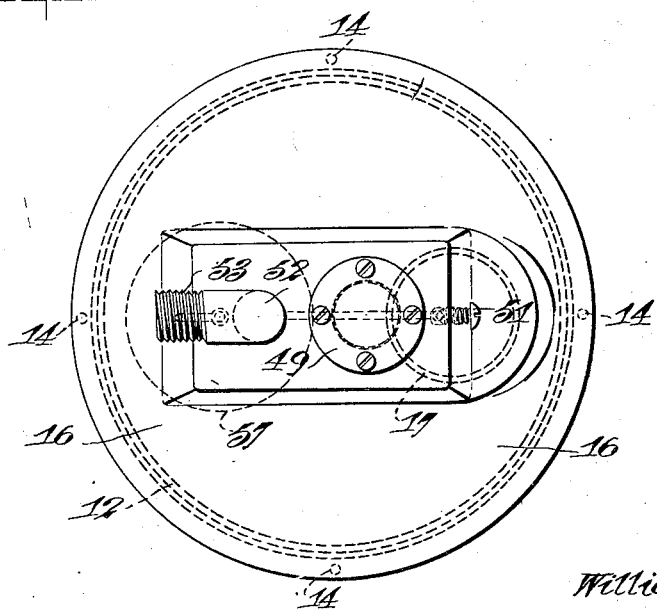
INVENTOR
William E. Hart.
BY
ATTORNEY Aug. 13, 1929. W. E. HART 1,724,582
LIQUID FUEL ELEVATING DEVICE FOR MOTOR VEHICLES
Filed Dec. 31, 1927 3 Sheets-Sheet 2
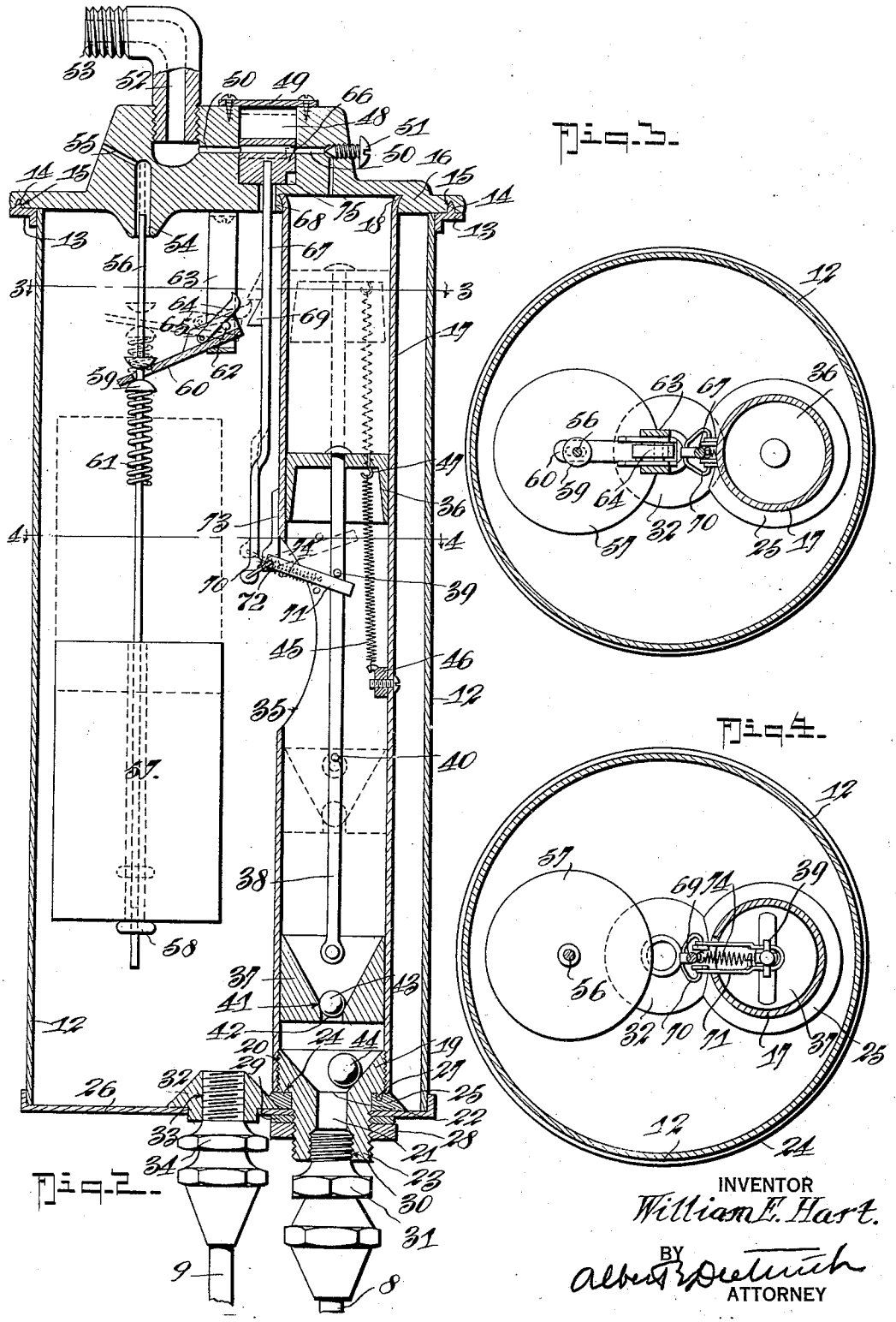
INVENTOR
William E. Hart.
BY
ATTORNEY Aug. 13, 1929.          W. E. HART          1,724,582
LIQUID FUEL ELEVATING DEVICE FOR MOTOR VEHICLES
Filed Dec. 31, 1927        3 Sheets-Sheet 3
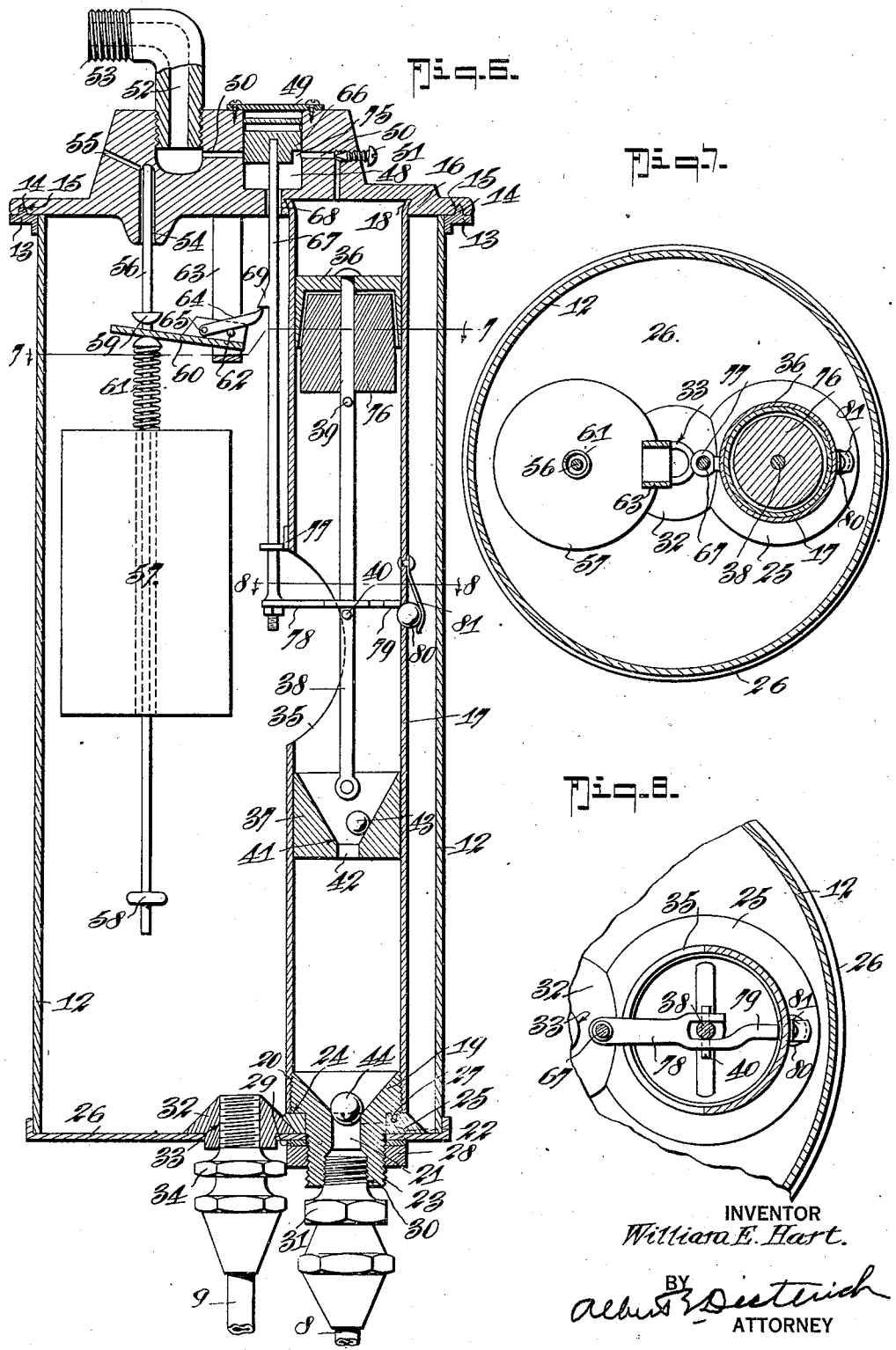
INVENTOR
William E. Hart.
BY
Albert B. Dietrich
ATTORNEY Patented Aug. 13, 1929.

1,724,582

UNITED STATES PATENT OFFICE.

WILLIAM E. HART, OF SAN JOSE, CALIFORNIA.

LIQUID-FUEL-ELEVATING DEVICE FOR MOTOR VEHICLES.

Application filed December 31, 1927. Serial No. 243,940.

In the use of hydrocarbon motors in motor vehicles, it is commonly necessary to arrange the main fuel tank at a point lower than the motor carbureter. This arrangement makes it necessary to provide means, preferably operated by the motor, for drawing or forcing the fuel from the main tank to the carbureter.

Therefore, my present invention has for its object to provide a new and improved device for suitably elevating the fuel from the main fuel tank to a suitable elevation so that it can thereafter flow by gravity to the carbureter for use as required, said device having provision for accomplishing said fuel elevation by a direct mechanical pumping function actuated by engine suction, slight in degree and directed to the pumping mechanism without direct contact with the liquid fuel.

In its more detailed nature the invention seeks to provide a new and improved fuel elevating device comprising a casing, means to connect the casing with the main fuel tank for supply and with the engine carbureter for delivery, a suction pump mechanism in the tank and adapted to be operated by the engine suction to pump fuel from said main tank into the casing to flow therefrom to the carbureter, and means to control the operation of the pump mechanism to cause it to operate continuously when the fuel level in the casing has reached a low level and to cause the continuous pumping action to cease when the fuel level in the casing has been raised to a desired high level.

Other objects in the way of features of structure, arrangement and operation of the device, will in part be obvious and in part be pointed out hereinafter.

To the attainment of the aforesaid objects and ends, my invention consists in the novel details of construction, combination and arrangement of parts, all of which will be first fully described in the following detailed description, then be particularly pointed out in the appended claims, reference being had to the accompanying drawings, in which:—

Figure 1 is a diagrammatic side view illustrating the invention mounted for use.

Figure 2 is a vertical cross section of the device per se, the parts being shown in the pumping condition in full lines and in the at rest or non-pumping position in dotted lines.

Figures 3 and 4 are horizontal cross sections taken on the lines 3—3 and 4—4 on Figure 2.

Figure 5 is a plan view of the device.

Figure 6 is a vertical cross section of the device showing a modified pump piston and modified control valve operating devices.

Figures 7 and 8 are horizontal sections taken on the lines 7—7 and 8—8 on Figure 6.

In the drawings, in Figure 1, I have diagrammatically illustrated the invention mounted for use. In this illustration 1 generally designates the main liquid fuel storage tank, 2 the internal combustion engine to be supplied by the tank, 3 the carbureter, and 4 the intake manifold of the engine, and 5 the vacuum pump tank in general which forms the subject matter of my present invention.

The device generally designated at 5 may be secured, as at 6, to the automobile dash 7 or to any other suitable support. The said tank 5 is connected by the fuel supply line 8 with the main tank 1 and by the fuel feed line 9 with the carbureter 3. The said tank is also connected by a suction line 10 with the intake manifold 4 of the engine, the connection being made at 11.

It should be understood, of course, that the suction line 10 may be connected with any other suitable source of suction and serves to cause the mechanical pumping device which forms a part of the vacuum pump tank 5 to operate at proper times as will hereinafter be described.

The tank or device generally indicated by the numeral 5, in its detailed structure, includes a tank or casing 12 having a flange 13 secured at its upper end, which flange is provided with a plurality of upstanding teats 14 adapted to fit into sockets 15 formed in the head or cap plate 16 to prevent relative movement of the said casing and cap.

A pump cylinder or tube 17 is secured at its upper end, as at 18, to depend from the cap plate 16 and has a valve head 19 threaded into its lower end as at 20. The valve head 19 has a fuel passage 21 through the valve seat 22 formed therein and a downwardly extended externally threaded shank 23 forming a shoulder 24 to engage the mounting ring 25 carried by the casing bottom closure cap 26 which is also provided with an aperture to permit passage of the shank 23.

The valve head 19 and the mounting ring 25 are provided with teat and socket equipment 27 to prevent relative movement of parts when the cap plate 16 and bottom cap 26 are clamped to position, liquid tight, on the ends of the casing 12. I provide a single securing means to clamp the said casing and end plates together. The securing nut 28 threaded on the shank 23 serves the clamping purpose just referred to and a gasket 29 interposed between the said nut and the bottom cap 26 and surrounding the said shank serves to prevent leakage through the securing aperture in the said bottom cap.

The shank 23 is provided with a threaded socket 30 to receive the threaded end of the fittings 31 by which the liquid fuel supply line 8 is secured to the tank.

A mounting ring 32 is suitably secured in the bottom cap and is provided with a threaded bore 33 to receive the threaded extension of suitable fittings 34 by which the liquid fuel feed line 9 leading to the carbureter is secured to the casing 12 to communicate with the interior thereof.

The pump cylinder or tube 17 is provided with a lateral cut-out portion 35 through which the liquid fuel pumped upwardly into the tube through the supply line 8 may discharge into the interior of the casing 12 proper. A suction piston 36 is vertically reciprocable in the tube 17 and serves as a moving means for the valved pump piston 37 connected thereto by the rod 38, which rod is provided with upper and lower operating pins 39 and 40, the purpose for which will later be apparent.

A valve seat 41 is provided in the piston 37 and extending through the said seat and piston is a fuel passage 42 controlled by a back check ball valve 43 which works alternately and oppositely with the similar ball valve 44 cooperative with the seat 22 of the valve head 19. A light retractile coil spring 45 is connected at 46 to the tube 17 and at 47 to the suction piston 36 and aids the force of gravity in tending to hold the suction piston 36 at its lowered position illustrated in full lines in Figure 2 of the drawings.

The head plate 16 is provided with a valve bore 48 which is covered by a plate 49 which is loosely mounted over the said bore to permit the ingress of air while protecting the said bore from undesirable foreign matter. The valve bore is traversed by a suction duct 50 provided in the said plate and which communicates through a downward L extension, with the interior of the tube 17 above the suction piston 36, which suction duct is controlled by an adjusting screw 51.

The duct 50 connects with the suction line 10 through a suitable fitting 52 to which the said line is connected as at 53.

The head plate 16 is also provided with a guide bore 54 which communicates with atmosphere through an air duct 55 provided in the said head plate and which said bore serves as a guide for the upper end of the stem or standard 56 on which the control float 57 operates. The stem 56 is provided with a lower or support stop 58 and a pair of spaced upper stops 59 between which pair of stops the slotted end of the lever 60 works and from the lowermost one of the upper pair of stops a light coil cushion spring 61 depends into position for being engaged by the float when it rises to a suitable elevation in the casing 12. The spring 61 serves to yieldably cushion engagement of the float with the upper stops and is more desirable than a positive contact as it provides a certain resiliency to the float action.

The lever 60 is pivoted at 62 to a bracket 63 which depends from the cap plate 16 and has a latch dog 64 pivoted thereon as at 65 the purpose for which will later be apparent.

A valve body 66 is vertically reciprocable in the valve bore 48 and carries a depending stem 67 which passes through a bore 68 communicating between the valve bore 48 and the interior of the casing 12.

The stem 67 is provided with a latch lug 69 and is link-connected at 70 at its lower end by a somewhat stirrup-shaped link to the valve throw lever 71 which is also somewhat stirrup-shaped. One end of the said link also serves to pivot the lever at the point 72 to a bracket 73 carried by the tube 17.

A spring 74 is connected to the lever 71 and to the stem 67 to constitute a toggle connection which, when the lever 71 is engaged by the upper operating pins 39 on downward movement of the suction piston, will serve to change, by a snap action, the position of the valve body 66 from its elevated position illustrated in dotted lines in Figure 2 of the drawings to its lowered position illustrated in full lines in that figure. A reverse snap movement of the parts is effected at the upper limit of movement of the suction piston by the lower operating pins 40.

The valve body 66 is provided with a cross duct forming a continuation of the suction duct 50 and is also provided with an air port 75, the purpose for which will presently appear.

In operation, assuming the parts to be mounted as shown in Figure 1 of the drawings, and positioned as illustrated in full lines in Figure 2 of the drawings representing that the level of liquid fuel in the casing 12 has fallen to a point causing the float 57 to strike the stop 58 and release the latch dog 64. Awaiting this action pin 39 resting on lever 71, the spring 45 and the action of gravity have pulled suction head 36 down the additional distance necessary to reverse the position of the valve body 66 to the position illustrated in full lines in Figure 2. This effects an opening of the suction duct leading into the tube 17 above the suction piston 36 and by creating a partial vacuum in the said upper end of the tube draws the said suction piston upwardly until the lower operating pins 40 engage the lever 71 and reverse the position of the valve body 66, allowing the coil spring and gravity to again return the suction piston to the lower position when the upper operating pins 39 will engage the lever 71 and again reverse the position of the valve body and again open suction communication. Thus, the mechanical pumping function is constantly carried on alternately cutting on and off suction communication, and liquid fuel is thus mechanically pumped into the casing 12 through the cut-out 35 until the control float is elevated into engagement with the cushion spring to set the lever 60 to cause the latch dog 64 thereof to engage under the latch 69 of the valve body stem 67 and hold the same at its upper or suction duct cut-off position. With the parts thus locked atmospheric communication between the air duct 55, the bore 68 and the air port 75 between the chambers formed inside the casing 12 and tube 17 respectively will serve to cut off the mechanical pumping action but will allow the suction head to move downwardly. The pumping action will again be started when the parts return to the position first described in this description of the operation of the device.

In Figures 6, 7 and 8 I have illustrated a modified form of the invention in which a weight 76 is attached to the connecting or operating rod 38 to serve a function equivalent to that formed by the retractile spring 45.

In this form also the valved body stem 67 slides in a bracket 77 bent out from or secured to the tube 17 and has its lower end secured to a horizontal bar 78 which acts in the nature of a rigid horizontal arm and is shaped to straddle the rod 38 in the manner clearly illustrated in Figure 8 of the drawings so that its extended end 79 will lie closely adjacent the far wall of the tube 17. The said bar end 79 is adapted to engage the spring pressed ball 80 which is held in a suitable socket formed in the tube wall by the spring 81. The spring pressed ball 80 serves as a sort of barrel latch to yieldably hold the bar 78 and the valve body either at the elevated suction cut-off position or the lowered suction communicating position.

As the function of the invention modified as last described is generally the same as that of the form first described, further detailed description of the operation is thought to be unnecessary.

In the foregoing description, I have disclosed a liquid fuel elevating device of simple construction and efficient in operation and in which the liquid fuel is mechanically pumped into the device by mechanical means set into motion by suction action provided by the engine supplied by the device, in which, however, no direct contact between the engine suction and the liquid fuel being pumped is permitted.

From the foregoing description, taken in connection with the accompanying drawings, it is thought that the novel details of construction, the manner of use and the advantages of my invention will be readily apparent to those skilled in the art to which it relates.

What I claim is:

1. A device of the character described comprising a casing, a removable cap plate, a removable bottom plate, means to connect the casing with a source of liquid fuel supply through said bottom plate, means to feed the liquid fuel from the casing, a pump tube carried by the cap plate and depending inside the casing, suction actuated pumping mechanism operable in the tube, said tube being in communication with the interior of said casing, means to connect the tube with a source of suction through said cap plate, means to secure the depending tube end against the bottom plate and in communication with fuel supply connection through said bottom plate, and means to control the pumping action.

2. A device of the character described comprising a casing, a removable cap plate, a removable bottom plate, means to connect the casing with a source of liquid fuel supply through said bottom plate, means to feed the liquid fuel from the casing, a pump tube carried by the cap plate and depending inside the casing, suction actuated pumping mechanism operable in the tube, said tube being in communication with the interior of said casing, means to connect the tube with a source of suction through said cap plate, means to secure the depending tube end against the bottom plate and in communication with fuel supply connection through said bottom plate, said tube end securing means constituting the sole means to secure the casing, the cap plate and the bottom plate together, and means to control the pumping action.

3. A device of the character described comprising a casing, a removable cap plate, a removable bottom plate, means to connect the casing with a source of liquid fuel supply through said bottom plate, means to feed the liquid fuel from the casing, a pump tube carried by the cap plate and depending inside the casing, suction actuated pumping mechanism operable in the tube, said tube being in communication with the interior of said casing, means to connect the tube with a source of suction through said cap plate, means to secure the depending tube end against the bottom plate and in communication with fuel supply connection through said bottom plate, said tube end securing means constituting the sole means to secure the casing, the cap plate and the bottom plate together, interlocking elements to prevent relative movement of the cap plate, the bottom plate and the casing, and means to control the pumping action.

4. In a device of the character described, a hollow casing, a pump tube in the casing and connected fluid tight at top and bottom in the casing but having a cutout intermediately of its ends to communicate with the interior of the casing, a suction duct communicating with the upper end of the tube, means to connect the suction duct with a suction source, means to connect a source of liquid fuel supply with the lower end of the tube, an air duct connecting the interior of the casing with atmosphere, another air duct for connecting the interior of the casing and the upper end of the tube at times, pumping elements reciprocable in the tube, means tending to hold the pumping elements at one end of their stroke, a suction control valve shiftable to alternately open suction communication and close air communication into the upper end of the tube and to close such suction communication and open such air communication, means automatically actuated by movement of the reciprocable elements to shift the control valve, and means to deliver fuel from the casing.

5. In a device of the character described, a hollow casing, a pump tube in the casing and connected fluid tight at top and bottom in the casing but having a cutout intermediately of its ends to communicate with the interior of the casing, a suction duct communicating with the upper end of the tube, means to connect the suction duct with a suction source, means to connect a source of liquid fuel supply with the lower end of the tube, an air duct connecting the interior of the casing with atmosphere, another air duct for connecting the interior of the casing and the upper end of the tube at times, pumping elements reciprocable in the tube, means tending to hold the pumping elements at one end of their stroke, a suction control valve shiftable to alternately open suction communication and close air communication into the upper end of the tube and to close such suction communication and open such air communication, means automatically actuated by movement of the reciprocable elements to shift the control valve, float controlled means to lock said shifting means to prevent control valve actuation and to release said shifting means to permit control valve actuation when proper, and means to deliver fuel from the casing.

6. In a device of the character described, a hollow casing, a pump tube in the casing and connected fluid tight at top and bottom in the casing but having a cutout intermediately of its ends to communicate with the interior of the casing, a suction duct communicating with the upper end of the tube, means to connect the suction duct with a suction source, means to connect a source of liquid fuel supply with the lower end of the tube, an air duct connecting the interior of the casing with atmosphere, another air duct for connecting the interior of the casing and the upper end of the tube at times, pumping elements reciprocable in the tube, means tending to hold the pumping elements at one end of their stroke, a suction control valve shiftable to alternately open suction communication and close air communication into the upper end of the tube and to close such suction communication and open such air communication, means automatically actuated by movement of the reciprocable elements to shift the control valve, said shifting means including snap throw devices to effect a snap movement to the control valve from one position to the other, and means to deliver fuel from the casing.

7. In a device of the character described, a hollow casing, a pump tube in the casing and connected fluid tight at top and bottom in the casing but having a cutout intermediately of its ends to communicate with the interior of the casing, a suction duct communicating with the upper end of the tube, means to connect the suction duct with a suction source, means to connect a source of liquid fuel supply with the lower end of the tube, an air duct connecting the interior of the casing with atmosphere, another air duct for connecting the interior of the casing and the upper end of the tube at times, pumping elements reciprocable in the tube, means tending to hold the pumping elements at one end of their stroke, a suction control valve shiftable to alternately open suction communication and close air communication into the upper end of the tube and to close such suction communication and open such air communication, means automatically actuated by movement of the reciprocable elements to shift the control valve, said shifting means including snap throw devices to effect a snap movement to the control valve from one position to the other, float controlled means to lock said shifting means to prevent control valve actuation and to release said shifting means to permit control valve actuation when proper, and means to deliver fuel from the casing.

8. In a device of the character described, a hollow casing, a pump tube in the casing and connected fluid tight at top and bottom in the casing but having a cutout intermediately of its ends to communicate with the interior of the casing, a suction duct communicating with the upper end of the tube, means to connect the suction duct with a suction source, means to connect a source of liquid fuel supply with the lower end of a tube, an air duct connecting the interior of the casing with atmosphere, another air duct for connecting the interior of the casing and the upper end of the tube at times, pumping elements reciprocable in the tube, means tending to hold the pumping elements at one end of their stroke, a suction control valve shiftable to alternately open suction communication and close air communication into the upper end of the tube and to close such suction communication and open such air communication, means automatically actuated by movement of the reciprocable elements to shift the control valve, said shifting means including a shifter stem having a latch lug, snap throw devices to effect a snap movement to the control valve from one position to the other, float controlled means to lock said shifting means to prevent control valve actuation and to release said shifting means to permit control valve actuation when proper, said float controlled means including a pivoted lever having a latch dog to lock engage the latch lug to prevent actuation of the control valve or to release from engagement with the latch lug to permit such valve actuation accordingly as said lever is moved, and means to cause the float to move the lever when it rises or falls to predetermined positions, and means to deliver fuel from the casing.

9. A device of the character described comprising a casing, means to connect the casing with a source of liquid fuel supply, means to feed the liquid fuel from the casing, a pump tube mounted in the casing, upper and lower suction actuated pumping elements operable in the tube, said tube having provision for communicating with the interior of the casing between the upper and lower elements, means to connect the tube with a source of suction, and means to control pump action of the said pumping elements.

10. A device of the character described comprising a casing, a cap plate, a bottom plate, means to connect the casing with a source of liquid fuel supply through said bottom plate, means to feed liquid fuel from the casing, a pump tube mounted in the casing to one side of the center thereof, upper and lower suction actuated pumping elements operable in the tube, said tube having provision for communicating with the interior of the casing between the said upper and lower elements, means to connect the tube with a source of suction through said cap plate, and fluid actuated means in said casing to control the pumping action of the said upper and lower elements.

WILLIAM E. HART.